Oct. 19, 1954 — M. TENGESDAL — 2,692,093
FISHING LINE REEL
Filed June 28, 1952
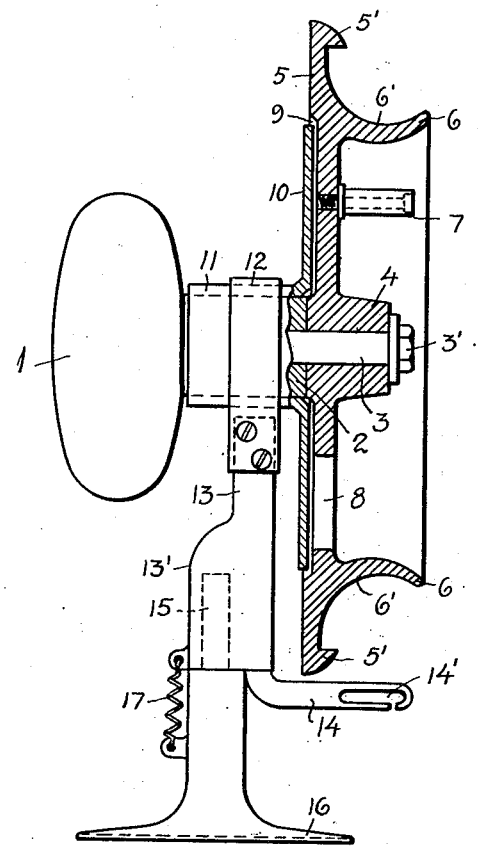
Inventor
Mikal Tengesdal
By Lauren P. Beaman
Attorney Patented Oct. 19, 1954

2,692,093

UNITED STATES PATENT OFFICE 2,692,093
FISHING LINE REEL
Mikal Tengesdal, Egersund, Norway
Application June 28, 1952, Serial No. 296,198
3 Claims. (Cl. 242—96)

The present invention relates to improvements in fishing line reels and the object of the invention is to provide a reel especially adapted to be used in the hand.

According to the invention the fishing line reel consists mainly of a handle capable of being firmly held and grasped in a person's hand, a neck portion on said handle, a shaft protruding axially from said neck portion, a spool rotatably supported on said shaft and braking means cooperating with an end surface of said spool and operable by means of a finger of the person's hand.

An embodiment of the invention is as an example illustrated in the accompanying drawing which shows a side elevation partly in section of the reel.

In the drawing 1 denotes a handle in the shape of a sphere, knob or another suitable form which enables the handle to be tightly grasped in a person's hand.

The handle 1 is provided with a neck portion 2 having a spindle 3 extending axially from said portion 2 and serving as pivot for a rotatable spool which is retained on the spindle 3 by means of a nut 3' threaded on the outer end thereof.

The spool consists of a boss 4 having a disc shaped radial flange at the end thereof which engages the neck portion 2. On said flange is arranged a circumferential side flange 6 having an outer concave surface 6' which serves as support for the line. The surface 6' is extended somewhat into the material of the flange 5, as shown, so as to form a laterally directed flange 5' having a hook shaped cross section which serves to prevent the fishing line from running over the flange 5.

The spool may be rotated by means of winding handle 7 rotatably secured to the front face of the flange 5 by a suitable pin secured thereto or by means of an aperture 8 arranged in said flange 5 and adapted for insertion of a finger therein for the purpose specified. In the rear face of the flange 5 is arranged a circular recess 9 which receives a brake disc 10 of a flexible material, such as rubber, leather or the like. The disc 10 is secured on, or integral with, a hollow boss 11 which encloses the neck portion 2 of the handle 1 and is secured thereon by means of a clamping ring 12 or the like. To said clamping ring is secured an angle arm 13, 14 the outer portion 14 of which extends parallel to the axis of the spool and is provided with an outwardly open slit 14' serving as a guide for the line during rewinding thereof.

During use the reel may be held by the hand so that the line pulls off the spool in the axial direction thereof, while the spool is stationary, or at right angles thereto while the spool is rotating. The rate of rotation of the spool may be regulated in an easy manner by pressing a finger against the flexible disc 10, which thereby is pressed against the bottom of the recess 9 and serves as a brake. The rewinding of the line is, as above mentioned, effected by rotating the spool by means of the winding handle 7 or by a finger inserted into the aperture 8.

In order to make it possible also to secure the reel to a fishing rod the portion 13 of the angle arm may be provided with a side projection 13' having a bore for receiving a tap 15 to which is secured an elongated plate 16 adapted to be secured in usual manner to the butt end of the fishing rod by sliding rings or the like which fit over the tapered ends of the plate 16. The tap is clamped in the bore 15 by means of a spring 17. The cross section of the bore and the tap received therein may be so formed that the tap may be inserted into said bore in at least two different positions, displaced at right angles to each other, so that the reel, in a manner known per se, may be positioned with the axis thereof parallel with the longitudinal direction of the rod, or at right angles thereto.

I claim:

1. In a fishing line reel, a handle, a neck portion on said handle, a shaft protruding axially from said neck portion, a spool rotatably supported on said shaft, a flexible braking disc cooperating with the end surface of said spool, a hollow boss on said disc enclosing said neck portion, a clamping ring secured over said boss and securing said disc upon said neck portion, an angle arm secured to said clamping ring, said angle arm including an outer portion which extends parallel to the axis of the spool and an outwardly open line guide slit in said outer portion.

2. In a fishing line reel, a handle, a neck portion on said handle, a shaft protruding axially from said neck portion, a spool rotatably supported on said shaft, a flexible braking disc cooperating with the end surface of said spool, a hollow boss on said disc enclosing said neck portion, a clamping ring securing said boss on said neck portion, an angle arm secured to said clamping ring the outer portion of which angle arm extends parallel to the axis of the spool, and an outwardly open guiding slit for the line in said outer portion.

3. In a fishing line reel as in claim 2, a spool comprising a boss, a disc shaped flange on said boss at the end adjacent said neck portion, a laterally directed flange, having a hook shaped cross section, along the circumference of said disc shaped flange and serving to prevent the fishing line from running over said flange.

References Cited in the file of this patent

UNITED STATES PATENTS

| Number | Name | Date |
| --- | --- | --- |
| 560,925 | Pflueger | May 26, 1896 |
| 2,047,705 | Porter | July 14, 1936 |
| 2,434,479 | Allen | Jan. 13, 1948 |
| 2,505,151 | Schweitz | Apr. 25, 1950 |
| 2,537,613 | Allen | Jan. 9, 1951 |